United States Patent
Clark et al.

(10) Patent No.: US 9,056,359 B1
(45) Date of Patent: Jun. 16, 2015

(54) LOCK BOLT COLLAR REMOVAL TOOL

(71) Applicants: Adam C. Clark, Seattle, WA (US); Lyle M. Wallace, Kent, WA (US); Dave G. Ellsworth, Kent, WA (US); Blaine F. Roberts, Kent, WA (US); Paul N. Stavig, Puyallup, WA (US); Daniel M. Sherick, Ravensdale, WA (US)

(72) Inventors: Adam C. Clark, Seattle, WA (US); Lyle M. Wallace, Kent, WA (US); Dave G. Ellsworth, Kent, WA (US); Blaine F. Roberts, Kent, WA (US); Paul N. Stavig, Puyallup, WA (US); Daniel M. Sherick, Ravensdale, WA (US)

(73) Assignee: The Boeing Company, Chicago, IL (US)

( * ) Notice: Subject to any disclaimer, the term of this patent is extended or adjusted under 35 U.S.C. 154(b) by 196 days.

(21) Appl. No.: 13/628,198

(22) Filed: Sep. 27, 2012

(51) Int. Cl.
*B25B 13/48* (2006.01)
*B23D 29/00* (2006.01)

(52) U.S. Cl.
CPC ............... *B23D 29/007* (2013.01); *B25B 13/48* (2013.01)

(58) Field of Classification Search
CPC ........ B25B 27/18; B25B 27/96; B25B 27/14; B25C 11/02; B23D 29/007; B21J 15/50; Y10T 29/5393
USPC .......... 81/55, 112, 90.3, 53.2; 29/255; 254/24
See application file for complete search history.

(56) References Cited

U.S. PATENT DOCUMENTS

| | | | | |
|---|---|---|---|---|
| 1,492,466 | A | * 4/1924 | Jarmolowsky | ..................... 279/7 |
| 2,688,185 | A | 6/1952 | Brazil | |
| 2,669,896 | A | * 2/1954 | Clough | ........................... 81/128 |
| 2,836,888 | A | * 6/1958 | Hargrove | ..................... 30/272.1 |
| 3,339,439 | A | * 9/1967 | Dalen et al. | ...................... 81/112 |
| 3,373,639 | A | * 3/1968 | Dalen et al. | ...................... 81/112 |
| 3,529,497 | A | * 9/1970 | Brooks | ........................... 81/463 |
| 3,735,650 | A | * 5/1973 | Weng, Jr. | ........................ 81/53.2 |
| 4,704,793 | A | * 11/1987 | Lockey | ............................ 30/187 |
| 4,762,030 | A | * 8/1988 | Nguyen | ............................ 81/55 |
| 4,807,348 | A | 2/1989 | Kaelin | |
| 5,095,779 | A | * 3/1992 | Batten | ............................... 81/55 |
| 5,438,891 | A | 8/1995 | Batten | ............................... 81/56 |
| 5,667,513 | A | * 9/1997 | Torrie et al. | .................... 606/104 |
| 6,134,992 | A | * 10/2000 | Perkins | .......................... 81/90.5 |
| 6,138,530 | A | * 10/2000 | McClure | ........................... 81/58 |
| 6,860,889 | B2 | * 3/2005 | Bonati et al. | .................. 606/104 |
| 7,059,216 | B2 | 6/2006 | Haines, Jr. | |
| 7,878,092 | B1 | * 2/2011 | Eby et al. | ......................... 81/112 |
| 8,579,270 | B1 | * 11/2013 | Hansen et al. | ..................... 269/6 |
| 2008/0247841 | A1 | 10/2008 | Mercer | |

* cited by examiner

*Primary Examiner* — Lee D Wilson
*Assistant Examiner* — Henry Hong
(74) *Attorney, Agent, or Firm* — Ostrager Chong Flaherty & Broitman P.C.

(57) ABSTRACT

An apparatus for removing a lock bolt collar from an installed lock bolt extending from a joint surface. The apparatus has an outer sleeve with a tubular conduit, and a joint engagement surface for contacting a surface of said joint. The apparatus also has an inner sleeve disposed within the tubular conduit of the outer sleeve. The inner sleeve has teeth for gripping and pulling the lock bolt collar. When the inner sleeve is pulled into the outer sleeve, a ridge disposed on an exterior surface of the inner sleeve pushes the teeth in a radially inward direction to grip and pull the lock bolt collar off the lock bolt.

6 Claims, 8 Drawing Sheets

LOCK BOLT COLLAR REMOVAL TOOL

TECHNICAL FIELD

The present disclosure is related to tools for removal of lock bolt collars and more particularly to a tool with teeth for gripping, deforming and pulling a lock bolt collar off of a lock bolt.

BACKGROUND

Lock bolts are commonly used to fasten two or more structures together. Typically, a threaded lock bolt with a head and a threaded tail section is inserted through holes in the two or more structures, and a collar is swaged onto the threaded tail section using a tool, such as a pneumatic gun. The structures are retained between the head and the collar.

Often, it may be required to remove collars from lock bolts in order to rework the joint, or for other reasons. There are several tools and methods for removing lock bolt collars.

Typically, a chisel is selected having a notch sized for the lock bolt. The chisel has an angled head which can be laid adjacent the joint surface from which the lock bolt extends. The angle of the head allows the head of the chisel to be flat against the joint surface while an opposing end displaced above the joint surface is impacted with a hammer. Upon impact, the lock bolt is knocked off by the head of the chisel. This method is dependent on the skill of the technician, and requires a certain degree of accuracy in placement and impacting of the chisel.

In another method, a nose assembly with a cutting anvil is used to shear a collar off of a lock bolt. The nose assembly may be used with a pneumatically actuated pull-gun, such as those available from Alcoa Inc., of New York, N.Y. The nose assembly grips and pulls the lock bolt such that a pair of cutters is brought against the collar to shear the collar. This method suffers from a difficulty in use. The first attempt to shear the collar is often unsuccessful, requiring the technician to rotate the tool by 90 degrees to attempt another cut. Further, in cases where the lock bolt is being removed because the bolt is too short, this tool may cause the top part of the collar to fold over the top of the bolt, making removal with the cutting tool impossible.

Thus it would be beneficial to provide a tool for easily removing lock bolt collars without providing any risk of damaging any underlying structure. It would further be beneficial to provide a tool which can be used with existing tools, such as pneumatic guns.

SUMMARY

A tool is therefore provided for easily removing a lock bolt collar. The tool generally comprises an inner sleeve slidably inserted within an outer sleeve. The inner sleeve comprises fingers having at least one tooth located on an inner surface, and a ridge located on an outer surface. To operate the tool, the tool is coupled with an actuator which can provide a pulling motion to the inner sleeve with respect to the outer sleeve. The tool is positioned such that the inner sleeve surrounds the lock bolt collar. The actuator is activated, to begin a pulling motion. During the pulling motion, the ridge on the outer surface of the fingers contacts an engagement surface of the outer sleeve, which pushes the fingers in an inward direction. This causes the teeth on the fingers to grip and deform the lock bolt collar. The inward force of the fingers works to release the material of the collar from the lock bolt pin. The pulling motion continues, and with the lock bolt collar gripped by the fingers, the collar is disengaged from and pulled away from the bolt.

An apparatus for removing a lock bolt collar from a lock bolt extending from a joint surface is provided, comprising: an outer sleeve comprising a proximal end, a distal end, a tubular conduit running through said outer sleeve from the proximal end to the distal end, and a joint engagement surface for contacting said joint surface; and an inner sleeve comprising a proximal end, a distal end, an interior surface and an exterior surface, said inner sleeve having a plurality of fingers in the distal end of the inner sleeve, at least one finger in said plurality of fingers comprising a tooth disposed on said interior surface for gripping and pulling a collar, and a ridge disposed on said exterior surface for contacting the distal end of the outer sleeve to push said at least one finger in a radially inward direction; said inner sleeve being disposed within said tubular conduit; and said finger formed from the distal end of the inner sleeve being compressable in response to pressure.

A combination actuator and apparatus for removing a lock bolt collar from a lock bolt extending from a joint surface is provided, said combination comprising: an apparatus comprising: an outer sleeve comprising a proximal end, a distal end, a tubular conduit running through said outer sleeve from the proximal end to the distal end, and a joint engagement surface for contacting said joint surface; and an inner sleeve comprising a proximal end, a distal end, an interior surface and an exterior surface, said inner sleeve having a plurality of fingers formed from the distal end of the inner sleeve, at least one finger in said plurality of fingers comprising a tooth disposed on said interior surface for gripping and pulling a collar, and a ridge disposed on said exterior surface for contacting the distal end of the outer sleeve to push said at least one finger in a radially inward direction; said inner sleeve being disposed within said tubular conduit; and said finger formed from the distal end of the inner sleeve being deformable in response to pressure; and an actuator comprising a device configured to be fixedly coupleable to said outer sleeve and to be movably coupleable to said inner sleeve, such that said actuator can provide a relative pulling motion to said inner sleeve with respect to said outer sleeve.

A method of removing a lock bolt collar from a lock bolt extending from a joint surface is provided, said method comprising: radially compressing and gripping the lock bolt collar; and pulling the lock away from the joint to remove the lock bolt collar from the lock bolt. Other objects, features and advantages will be apparent when the detailed description of the preferred embodiments is considered in conjunction with the drawings.

BRIEF DESCRIPTION OF THE DRAWINGS

Reference will now be made to the drawings, in which similar elements in different drawings bear the same reference numerals.

DETAILED DESCRIPTION

Figure 1A:
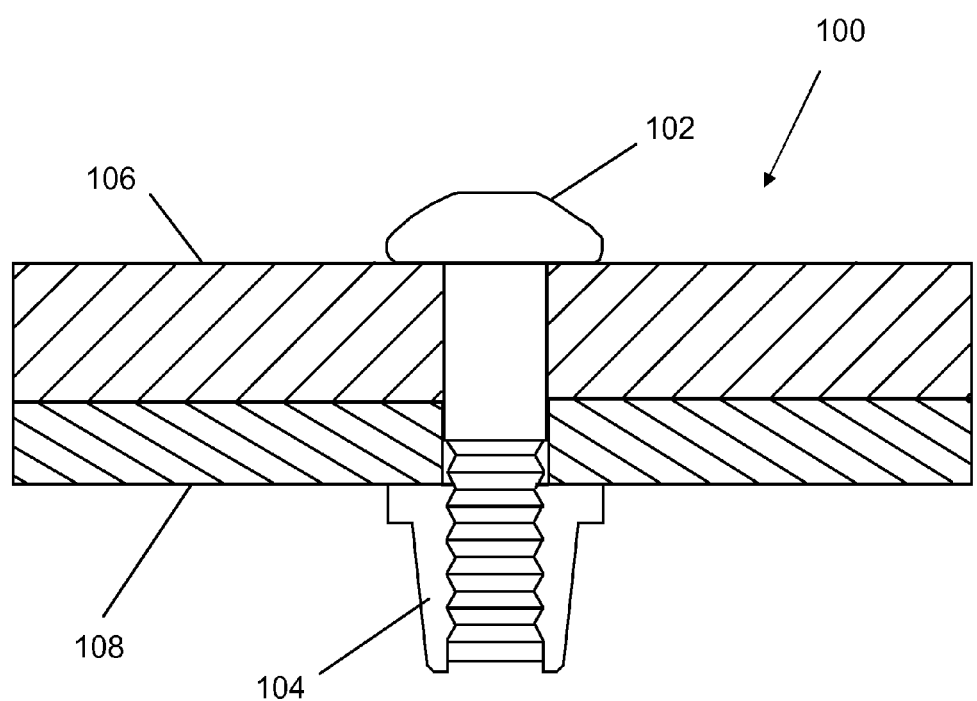
FIG. 1A is an illustration, in cross-sectional view, of a lock bolt with a collar connecting two structures.

The present disclosure is directed to an apparatus and method for removing lock bolt collars from a lock bolt. It is contemplated that the teachings provided herein are used to remove collars which are swaged onto a lock bolt, but collars coupled to bolts in other ways may be removed using the teachings provided herein as well. Although several embodiments of a lock bolt removal tool and method are set forth in the following description and in the drawings, one skilled in the art will understand that the teachings of this disclosure may be used for additional embodiments, or to modify the embodiments. For instance, while certain embodiments reference specific configurations of teeth and ridges, it may be appreciated by those of skill in the art that these configurations are exemplary and may be modified as desired.

FIG. 1A depicts a cross-sectional view of joint 100 in which a lock bolt 102 with swaged collar 104 connects two joint elements 106, 108. The apparatus disclosed herein is capable of quickly removing the swaged collar 104 from the lock bolt 102. It is contemplated that the apparatus disclosed herein is a "nose tip" for use on a pneumatic pull-type gun actuator. Such pneumatic pull-type gun actuators generally operate in conjunction with exchangeable "nose tips" which translate a standard pull-type motion provided by the actuator into a specific functionality. Pull-type gun actuators will not be described in great detail. Examples of suitable pull-type gun actuators are the Huck 246 Pneudralic Installation Tool, available from Alcoa Inc., of New York, N.Y., or the Huck 256 Rivet Tool, also available from Alcoa Inc., of New York, N.Y. It should be understood that the teachings described herein with respect to embodiments of the nose tip disclosed herein may be adapted for a variety of actuators, and that the general principles disclosed herein regarding the configuration of embodiments of the nose tip may be used to construct apparatuses for removal of lock bolt collars to be used with a wide variety of actuators.

Figure 1B:
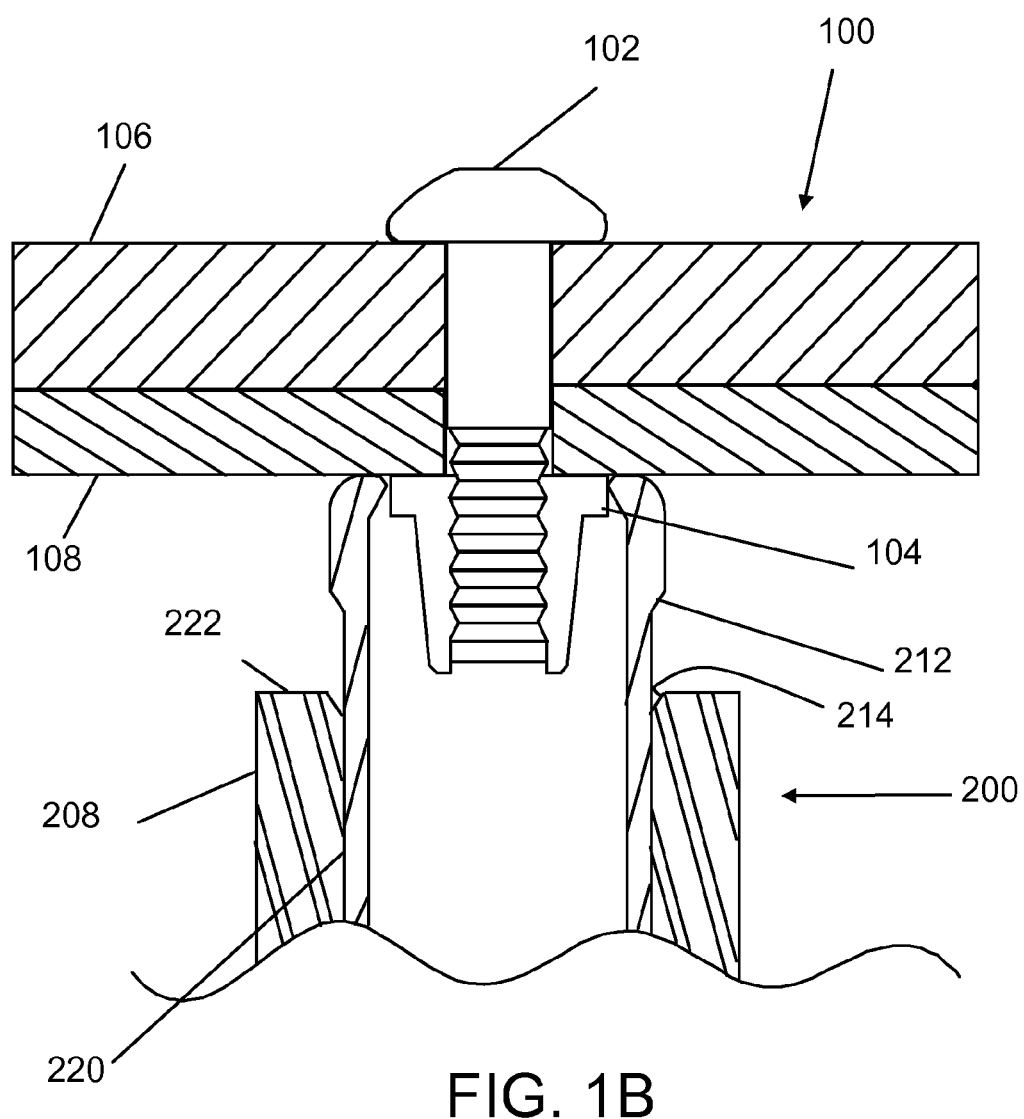
FIG. 1B is an illustration, in cross-sectional view, of a lock bolt with a collar connecting two structures, where the collar is being engaged by a tool for removing the collar.
Figure 1C:
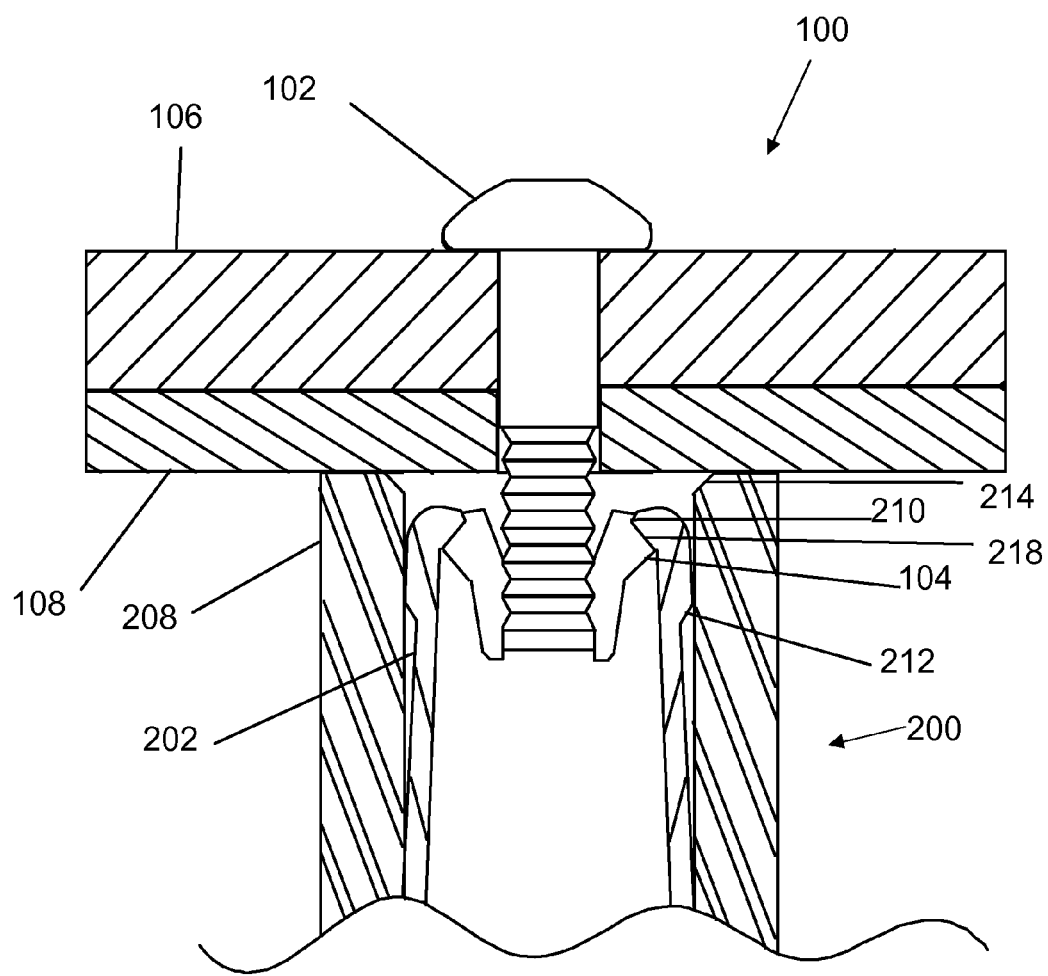
FIG. 1C is an illustration, in cross-sectional view, of a lock bolt with a collar connecting two structures, where the collar is in the process of being removed by a tool for removing the collar.
Figure 2A:
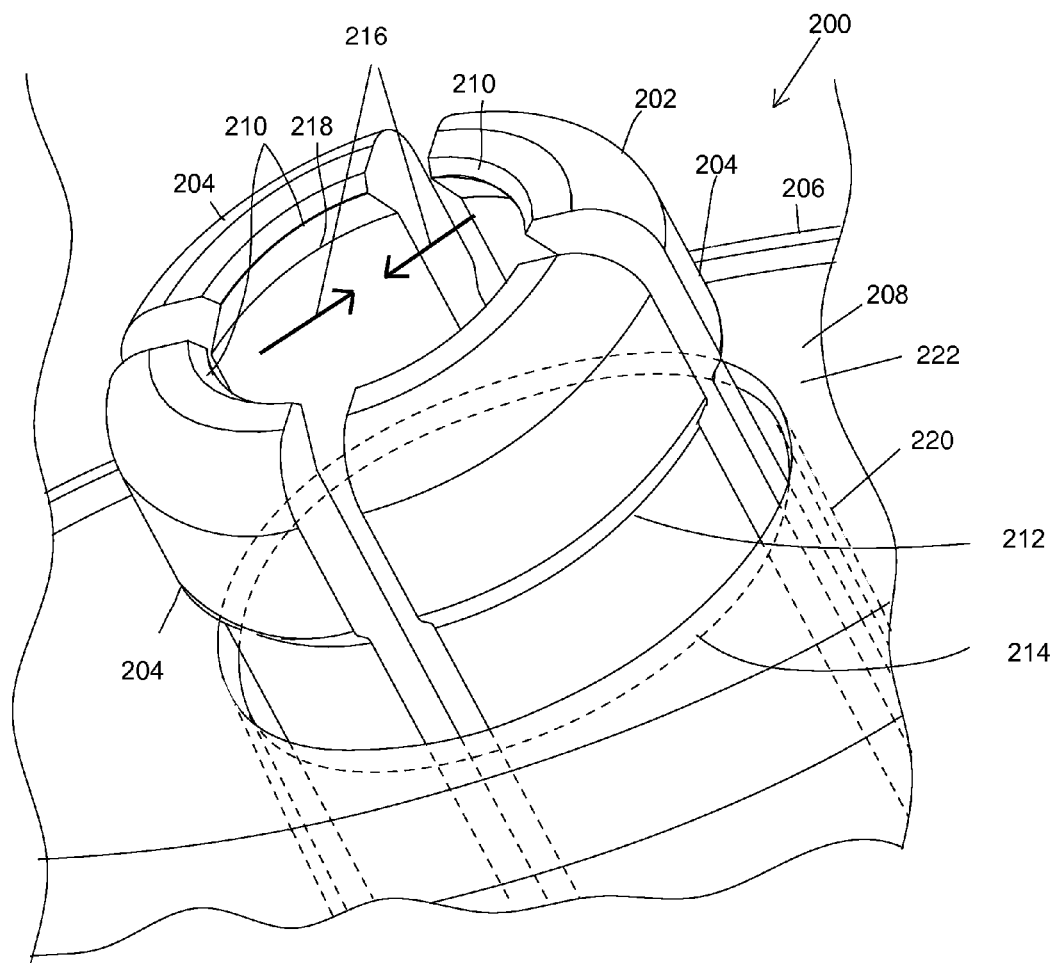
FIG. 2A is an illustration, in perspective view, of a first embodiment of a tool for removing a lock bolt collar.
Figure 3A:
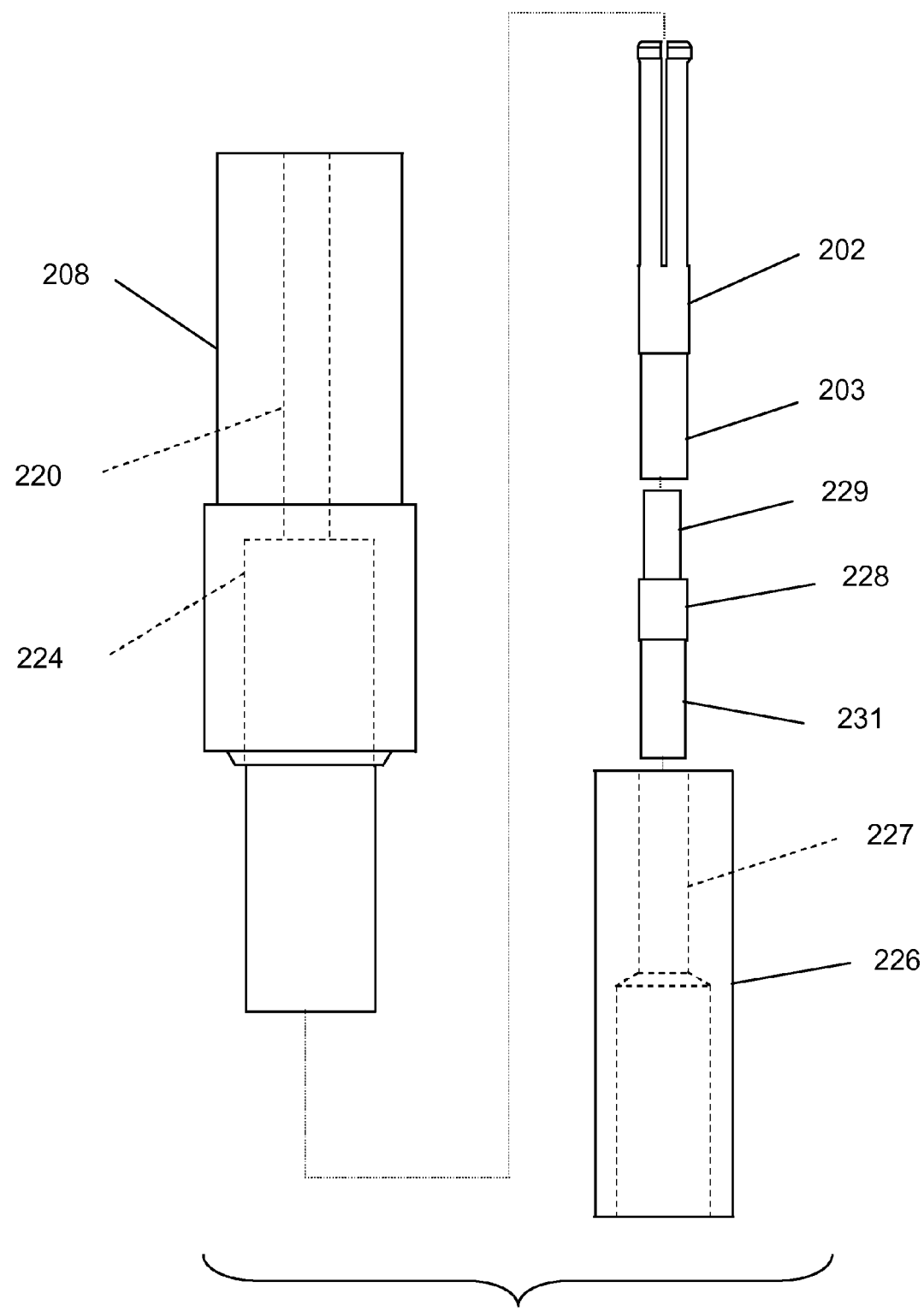
FIG. 3A is an illustration, in side view, showing an exploded view of an a tool for removing a lock bolt collar with connectors for coupling the tool to an actuator.
Figure 3B:
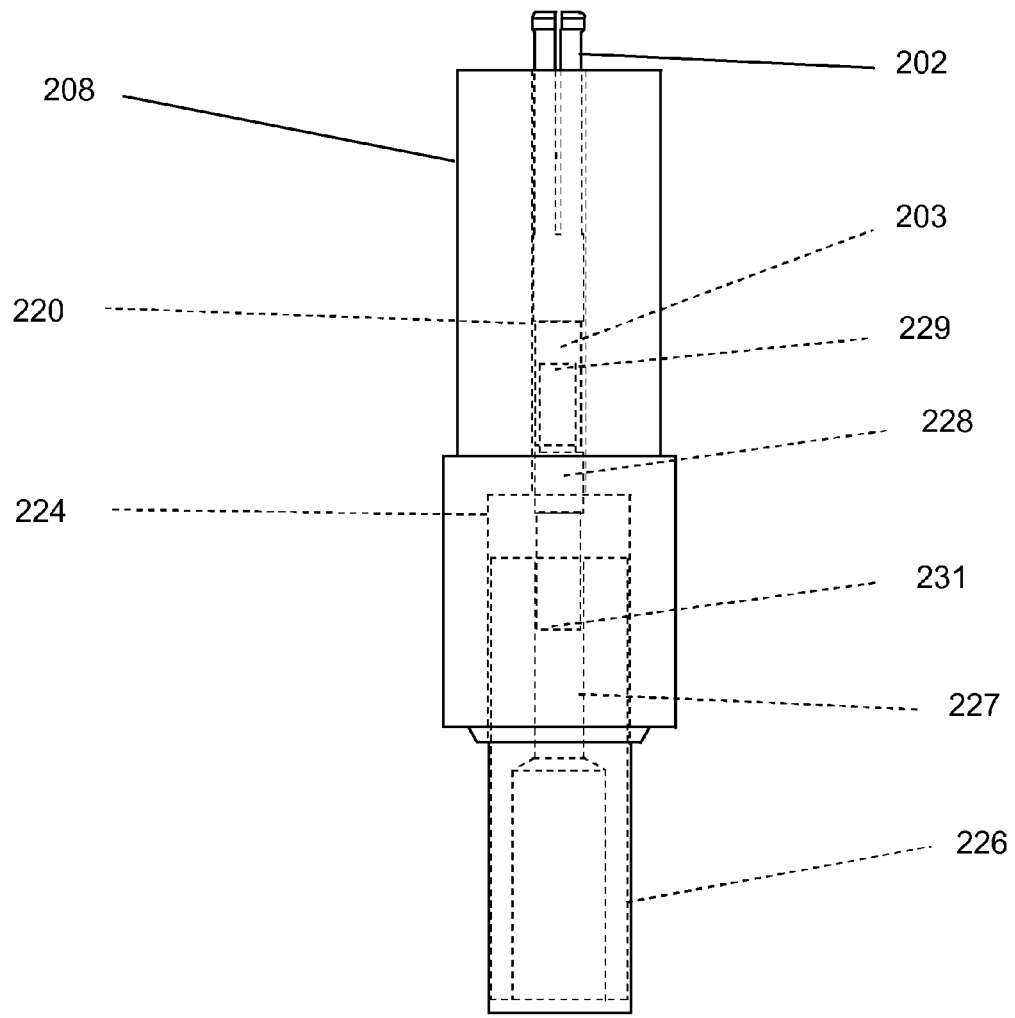
FIG. 3B is an illustration, in side view, showing an assembled view of the tool shown in FIG. 3A, in a first position which is at the beginning of a pull stroke.
Figure 3C:
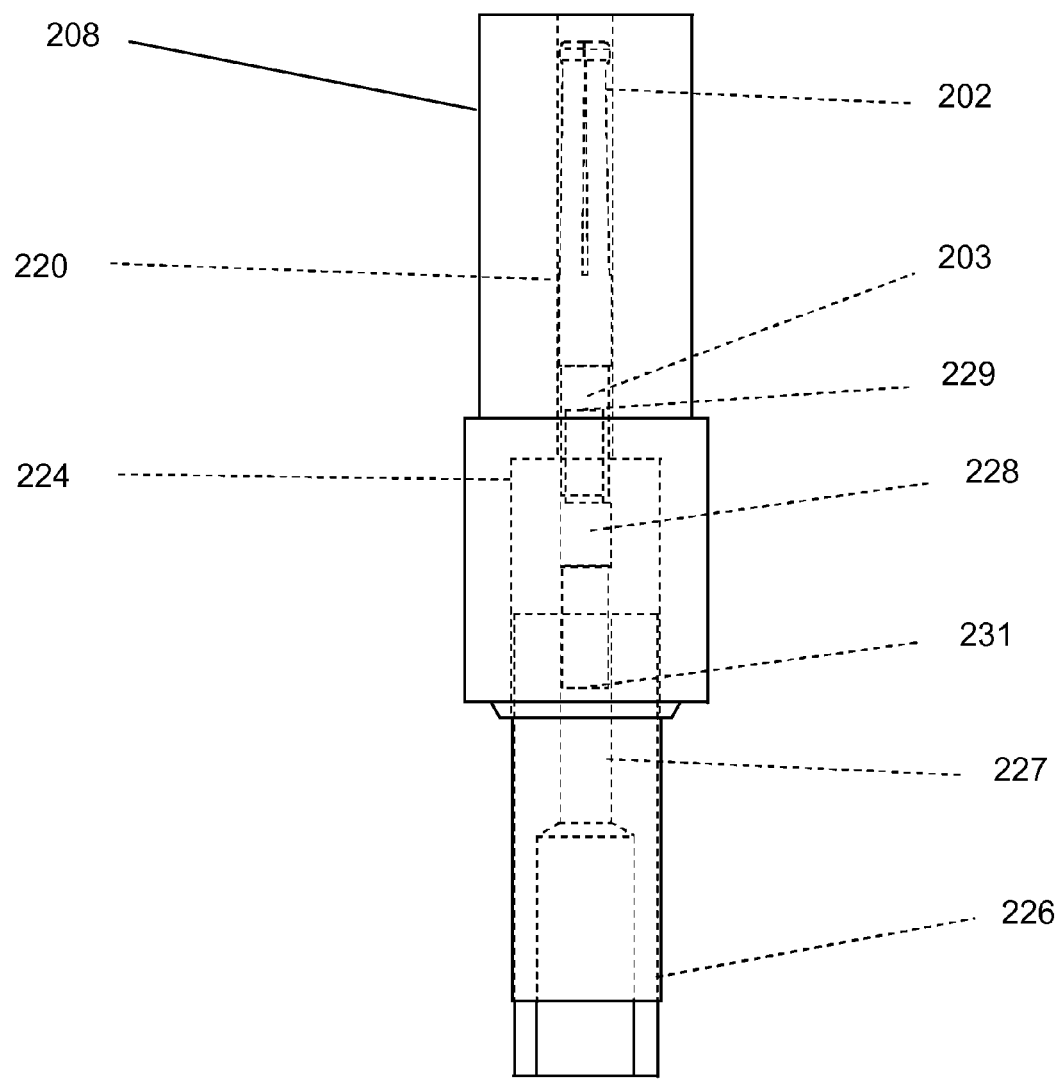
FIG. 3C is an illustration, in side view, showing an assembled view of the tool shown in FIG. 3A, in a second position which is at the end of a pull stroke.

As shown in FIGS. 1B, 1C and 2A, the apparatus 200 (nose tip) provided herein comprises an inner sleeve 202 and an outer sleeve 208, which are moveable with respect to each other. The inner sleeve 202 and outer sleeve 208 may both be approximately shaped as hollow, tubular sheaths. The shape of the tubular sheaths does not matter (i.e., round, oval, square, rectangular, triangular) provided the inner and outer sleeves have substantially the same shapes to provide for movement of the inner sleeve inside the outer sleeve. The relative motion of the inner sleeve 202 with respect to the outer sleeve 208 can be provided by a pull-type gun actuator of the type described in the background. To provide such motion, the outer sleeve 208 may be configured such that it remains in a fixed position relative to the actuator, while the inner sleeve 202 may be configured such that it is movable with respect to the outer sleeve 208 and the actuator. This may be done, for example, by mechanically coupling the inner sleeve 202 to a movable element of the actuator, while mechanically coupling the outer sleeve 208 to a fixed element of the actuator. Elements that may be used to couple the inner and outer sleeves to an actuator are shown in FIGS. 3A-3C and discussed below.

This disclosure makes reference to a "pull stroke," which is the pull-type motion of the inner sleeve 202 with respect to the outer sleeve 208. At the beginning of the pull stroke, the inner sleeve 202 is in a position wherein it extends past a joint engagement surface 222 of the outer sleeve 208, as shown for example in FIG. 1B and in FIG. 2A. At the end of the pull stroke, the inner sleeve 202 is disposed within the tubular conduit 220 in the outer sleeve 208. FIGS. 1B and 1C depict first and second positions, respectively, of an apparatus 200 being engaged with and removing a lock bolt collar 104, at different points in the pull stroke. FIG. 1B depicts an earlier point in the pull stroke, while FIG. 1C depicts a later point in the pull stroke. In FIG. 1B, the apparatus 200 is brought into initial engagement with the lock bolt collar 104. The actuator has not yet been activated. In FIG. 1C, the actuator has been activated, and the apparatus 200 has gripped and deformed the lock bolt collar 104 to ready the collar for removal from the lock bolt 102.

FIG. 1B depicts a first position in which the apparatus 200 is brought into engagement with the lock bolt collar 104. The inner sleeve 202 should be configured and sized such that the collar 104 to be removed fits inside the inner sleeve 202. To remove the collar 104 using the tool 200, the tool is first positioned such that the inner sleeve 202 surrounds the collar 104. Preferably, the actuator, and thus the inner sleeve 202, is positioned such that the inner sleeve 202 is in contact with the joint 100. As can be seen in FIG. 1B, the inner sleeve surrounds the collar 104 near the joint 100 and the inner sleeve 202 is in contact with the joint 100.

Once the inner sleeve 202 is positioned in this manner, the actuator is activated. This can be accomplished by, for example, a human operator pressing the trigger of the actuator. When the actuator is activated, the pull stroke begins. The pull stroke provides a pulling force to the inner sleeve 202, with respect to the outer sleeve 208. During the pull stroke, the inner sleeve 202 moves from an extended position in which the inner sleeve 202 extends out of the outer sleeve 208 to a retracted position, in which the inner sleeve 202 does not extend out of the outer sleeve 208 and is instead disposed within the tubular conduit 220.

While the pull stroke is happening, the operator of the actuator pushes the actuator towards the joint 100. This pushing force ensures that the inner sleeve 202 remains substantially in contact with the joint 100, even though the actuator is providing a pulling force to the inner sleeve 202. This pushing force also ensures that the pull stroke moves the outer sleeve 208 towards the joint 100.

The outer sleeve 208 moves towards from the joint 100 until a ridge 212 on an exterior surface of the inner sleeve 202 contacts the tapered surface 214 of the outer sleeve 208. At this point, the outer sleeve exerts a radially-inward pressure on the inner sleeve and the teeth 210 on the inner sleeve 202 are moved in a radially inward direction to compress around the collar 104. Through this compression, the teeth 210 grip and deform the collar 104, which helps to release the collar 104 from threads on the lock bolt 102.

The outer sleeve 208 continues to move towards the joint 100 until the joint engagement surface 222 contacts the joint 100. At this point, the fingers of the inner sleeve 202 are fully compressed and the lock bolt collar 104 is deformed such that the collar is disengaged from threads on the bolt as shown in FIG. 1C. Once the outer sleeve 208 contacts structural element 108, inner sleeve 202 moves downward and away from the joint, pulling the collar 104 off the lock bolt 102. At the end of the stroke, the inner sleeve 202 has fully pulled the collar 104 off of the lock bolt 102. The apparatus 200 may be removed from the lock bolt 102. Thereafter, the inner sleeve 202 may return to an initial position, the fingers 204 may move back in a radially outward direction to their initial position, thereby releasing the collar 104 from the inner sleeve 202.

In FIG. 2A, a first embodiment 200 of a nose tip apparatus is shown in more detail. The nose tip comprises an inner sleeve 202 slideably engaged within a tubular conduit 220 of an outer sleeve 208. The outer sleeve 208 has a joint engagement surface 222 for contacting the joint 100 during removal of a collar 104. The inner sleeve 202 has a plurality of fingers 204 and extends from the end 206 of the outer sleeve 208. The fingers 204 each have a horizontally-aligned tooth 210 on an interior surface and a ridge 212 on an outer surface. When the inner sleeve 202 is pulled into the outer sleeve 208, the ridges 212 on the outer surface of the fingers 204 engage a tapered interior surface 214 of the outer sleeve 208. The engagement of the tapered interior surface 214 with the ridges 212 forces the fingers 204 to be compressed in a radially inward direction 216, thus forcing the fingers 204 to close around the collar 104 and pull the collar off the lock bolt 102 as described above with respect to FIGS. 1A-1C. The presence of angled lower surfaces 218 on the teeth 210 provides a large amount of surface area with which to exert a pulling force on the collar 104. Preferably, the lower surface 218 of the teeth 210 should have an angle in the range of approximately 25 degrees to approximately 60 degrees, measured from the inner surface of the inner sleeve, although other angles are possible.

The ridges 212 on the exterior surface of the fingers and the tapered inner surface 214 of the outer sleeve 208 have abrupt angles to ensure that the fingers 204 close quickly around the collar 104 while the nose tip 200 is in operation, such that the collar 104 is gripped and deformed so that it can be pulled off a lock bolt 102. Preferably, the ridges have an angle of approximately 45 degrees, or may be within a range of approximately 25 degrees to approximately 65 degrees, as measured from the exterior surface of the inner sleeve. The tapered inner surface 214 may have an angle corresponding to the angle of the ridges.

The inner sleeve 202 is divided into fingers 204. The fingers 204 have ridges 212 on their exterior surfaces and teeth 210 on their interior surfaces. The outer sleeve 208 has a tubular conduit 220 in which the inner sleeve 202 is disposed. The end of the tubular conduit 220 has a tapered surface 214 which is shaped such that as the relative pulling motion is provided to the inner sleeve 202, the ridges 212 of the fingers 204 contact the outer sleeve 208, and the fingers 204 are forced in a radially inward direction. This inward movement of the fingers causes the teeth of the fingers to dig into and grip the material of the collar. This deforms the collar, moving some of the material of the collar outward through the spaces in between the fingers. This outward motion of the collar material disengages the material from the threads of the lock bolt, which helps to remove the collar from the lock bolt.

The inner sleeve 202 has four fingers 204, with spaces in between the fingers 204. This configuration "squares up" the material of the collar 104, which helps to remove the material of the collar from the lock bolt 102. It should be noted that although four fingers are depicted and described herein, it is contemplated that an inner sleeve having an alternative number of fingers is within the teachings of this disclosure.

Figure 2B:
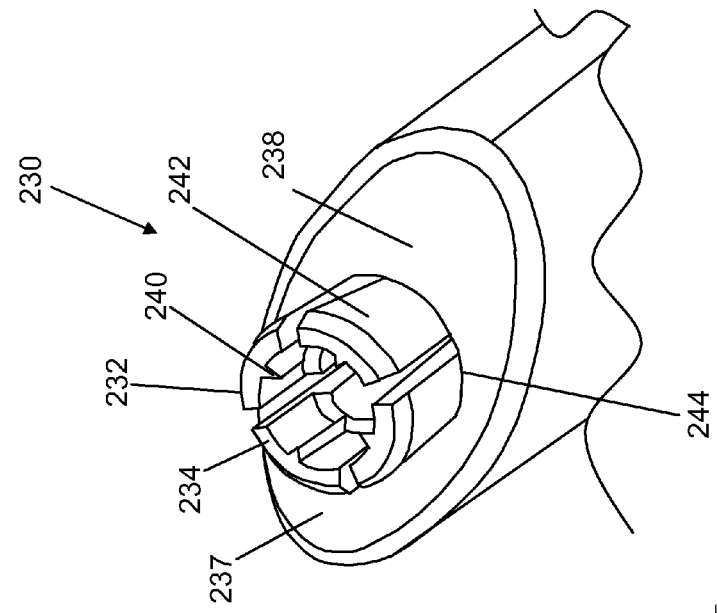
FIG. 2B is an illustration, in perspective view, of a second embodiment of a tool for removing a lock bolt collar.
Figure 2C:
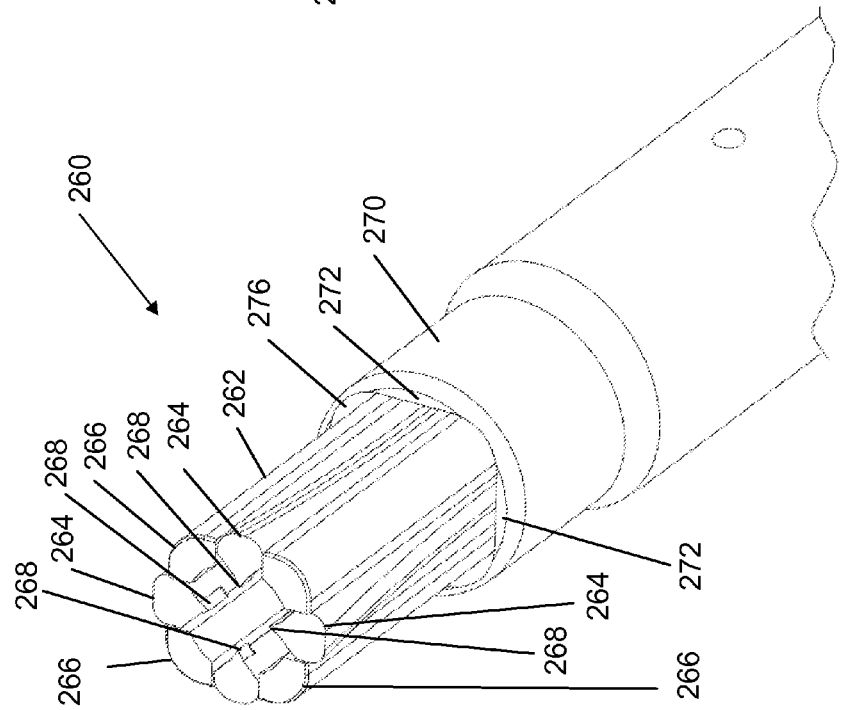
FIG. 2C is an illustration, in perspective view, of a third embodiment of a tool for removing a lock bolt collar.

FIGS. 2B and 2C depict additional embodiments of the apparatus, including different finger, ridge and tooth shapes and configurations. Corresponding tubular conduit shapes are depicted as well.

In FIG. 2B, a second embodiment 230 of the apparatus is shown. The inner sleeve 232 has a plurality of fingers 234 and extends from a joint engagement surface 237 of the outer sleeve 238. The fingers 234 each have a vertical tooth 240 on its interior surface and a ridge 242 on its exterior surface. The ridge 242 has a more gradually sloping surface in the second embodiment 230 than in the first embodiment 200, preferably approximately 10 degrees. When the inner sleeve 232 is pulled into the outer sleeve 238, the ridges 242 on the exterior surface of the fingers 234 contact a tapered inner surface 244 of the outer sleeve. The tapered surface 244 forces the fingers 234 to compress in a radially inward direction and close around the collar 104. The vertical teeth 240 compress the lock bolt collar during this compression motion to release the lock bolt collar from the lock bolt. As in the embodiment depicted in FIG. 2A, this compress-and-pull motion lifts some of the material of the collar off of the threads of the lock bolt, and further pulling motion removes the collar fully from the lock bolt.

In FIG. 2C, a third embodiment 260 of the apparatus is shown. The inner sleeve 262 has a plurality of hinged, movable fingers 264 alternating with immobile fingers 266. The movable fingers 264 each have a vertical tooth 268 which is larger than the teeth 240 shown in FIG. 2B. When the inner sleeve 262 is pulled into the outer sleeve 270, the movable fingers 264 are compressed in an inward direction by a plurality of sidewalls 272 that form an interior surface of a tubular conduit 276 of the outer sleeve 270. The vertical teeth 268 compress the lock bolt collar during this compression motion to release the lock bolt collar from the lock bolt. As in both embodiments above, the compress-and-pull motion removes the collar from the threads of the lock bolt and pulls the collar off of the lock bolt.

FIGS. 3A-3C depict several parts of an exemplary mechanism for connecting the apparatus 200 depicted in FIG. 2A to an actuator. It should be noted that these additional parts as described with respect to FIGS. 3A-3C are just one example of a way in which an inner and outer sleeve having the shape and features described above could be operatively connected to an actuator, and that other parts for achieving this purpose may be substituted to the same effect. For example, some of the parts depicted, such as the base connector 226, the intermediate connector 228 and the inner sleeve 202, may be a single, integrated component. Other configurations are possible. It should also be noted that FIG. 3A depicts an exploded view of an apparatus 200, while FIGS. 3B and 3C depict assembled views of the apparatus 200. The apparatus 200 in FIG. 3B is in a first position, at the beginning of a pull stroke, in which the inner sleeve 202 extends past the joint engagement surface 222 of the outer sleeve 208. The apparatus 200 in FIG. 3C is in a second position, at the end of a pull stroke, in which the inner sleeve 202 does not extend past the joint engagement surface 222 of the outer sleeve 208 and is disposed within the tubular conduit 220 of the outer sleeve 208.

The apparatus comprises an inner sleeve 202, slideably engaged with an outer sleeve 208, as described above with respect to FIG. 2A. Tubular conduit 220 is disposed within outer sleeve 208 and is in communication with chamber 224. Base connector 226 is configured to be coupled with an intermediate connector 228 and with the actuator (not shown). Base connector 226 can be coupled to the intermediate connector 228 through the use of threads. For example, upper chamber 227 of base connector 226 may have internal threads which mate with external threads on lower portion 231 of intermediate connector 228. Other methods of coupling the intermediate connector 228 to the base connector 226 are possible.

Intermediate connector 228 is configured to be coupled with inner sleeve 202. One way in which this could be done is through the use of pin hole disposed through both the intermediate connector 228 and the inner sleeve 202. Upper end 229 of intermediate connector 228 may be placed within lower end 203 of inner sleeve 202. Then, pins (not shown) may be disposed through holes (not shown) in the inner sleeve 202, thereby connecting intermediate connector 228 to inner sleeve 202. Other methods of coupling the intermediate connector 228 to the inner sleeve 202 are possible.

When base connector 226 is connected to intermediate connector 228 and inner sleeve 202, this assembled configuration can be inserted into the chamber 224 in the outer sleeve 208, and the inner sleeve 202 pushed into and through the tubular conduit 220 such that the inner sleeve 202 is inserted into the tubular conduit 220 and a portion of the inner sleeve 202 extends outside the outer sleeve 208, as shown for example in FIG. 3B. Alternatively, the base connector 226 and intermediate connector 228 may be connected first and inserted into the chamber 224 of the outer sleeve 208. Then, the inner sleeve 202 may be inserted into the tubular conduit 220 of the outer sleeve 208 through the top end of the outer sleeve 208 and coupled to the base connector 226 and intermediate connector 228.

Subsequently, the entire resulting assembly can be coupled to an actuator in any of a number of ways that allows relative motion of the inner sleeve 202 relative to the outer sleeve 208. For example, outer sleeve 208 can be connected, using threads, to threads on an actuator, while base connector 226 can be coupled to a movable portion of an actuator.

Intermediate connector 228 is operatively coupled to both the base connector 226 and the inner sleeve 202, thereby allowing actuator (not shown) to provide relative motion of the inner sleeve 202 with respect to the outer sleeve 208 during operation. To operate the apparatus, the actuator provides a pulling motion to the base connector 226, which is transferred through the intermediate connector 228 to the inner sleeve 202. As described above, the presence of ridges 212 on the fingers 204 of the inner sleeve causes the fingers 204 to be displaced in an inwards direction 216 during the pull motion, which compresses the fingers 204 against the collar to grip the collar and remove the material of the collar from the threads of the lock bolt, as described above.

While the disclosure has been described with reference to various embodiments, it will be understood by those skilled in the art that various changes may be made and equivalents may be substituted for elements thereof without departing from the scope of the disclosure. In addition, many modifications may be made to adapt a particular situation to the teachings of the disclosure without departing from the essential scope thereof. Therefore it is intended that the disclosure not be limited to the particular embodiment disclosed herein contemplated for carrying out the methods of this disclosure, but that the disclosure will include all embodiments falling within the scope of the appended claims.

The invention claimed is:

1. An apparatus for removing a lock bolt collar from a lock bolt extending from a joint surface, said apparatus comprising:
    an outer sleeve comprising a tubular conduit running through said outer sleeve from a proximal end to a distal end thereof, and a joint engagement surface at the distal end for contacting said joint surface, the joint engagement surface having a tapered inner surface at an inner edge of the joint engagement surface; and
    a hollow inner sleeve disposed within said tubular conduit and comprising a proximal end, a distal end, an interior surface and an exterior surface, said inner sleeve having a plurality of fingers in the distal end of the inner sleeve, each of the fingers comprising a tooth positioned proximate a distal end of the fingers to extend horizontally across the entire distal end of each of the fingers on said interior surface for gripping and pulling the lock bolt collar, and a ridge disposed on said exterior surface for contacting the tapered inner surface of the joint engagement surface of the outer sleeve to push said fingers in a radially inward direction, the inner sleeve configured to move from an extended position in which the fingers extend out of the outer sleeve to a retracted position in which the fingers retract into the outer sleeve and the distal end of the inner sleeve is beyond the joint engagement surface at the distal end of the outer sleeve;
    the tooth in each of the fingers having a lower surface disposed at a tooth angle of 25-60 degrees measured from the interior surface; the ridge in each of the fingers having a lower surface disposed at a ridge angle of 25-60 degrees measured from the exterior surface of the inner sleeve; and the tapered inner surface of the joint engagement surface having an angle corresponding to the ridge angle.

2. The apparatus of claim 1, wherein:
    the tooth in each of the fingers is positioned horizontally to extend in a direction perpendicular to a length of the inner sleeve.

3. The apparatus of claim 1, wherein the lower surface of the tooth in each of the fingers extends from the interior surface and faces toward the proximal end of the inner sleeve.

4. A tool for removing a lock bolt collar from a lock bolt extending from a joint surface, said tool comprising:
    an apparatus comprising:
        an outer sleeve comprising a tubular conduit running through said outer sleeve from a proximal end to a distal end thereof, and a joint engagement surface at the distal end for contacting said joint surface, the joint engagement surface having a tapered inner surface at an inner edge of the joint engagement surface; and
        a hollow inner sleeve disposed within said tubular conduit and comprising a proximal end, a distal end, an interior surface and an exterior surface, said inner sleeve having a plurality of fingers formed in the distal end of the inner sleeve, each of the fingers comprising a tooth positioned proximate a distal end of the fingers to extend horizontally across the entire distal end of each of the fingers on said interior surface for gripping and pulling the lock bolt collar, and a ridge disposed on said exterior surface for contacting the tapered inner surface of the joint engagement surface of the outer sleeve to push said fingers in a radially inward direction, the inner sleeve configured to move from an extended position in which the fingers extend out of the outer sleeve to a retracted position in which the fingers retract into the outer sleeve and the distal end of the inner sleeve is beyond the joint engagement surface at the distal end of the outer sleeve;
        the tooth in each of the fingers having a lower surface disposed at a tooth angle of 25-60 degrees measured from the interior surface; the ridge in each of the fingers having a lower surface disposed at a ridge angle of 25-60 degrees measured from the exterior surface of the inner sleeve; and the tapered inner surface of the joint engagement surface having an angle corresponding to the ridge angle; and an actuator comprising a device configured to be fixedly coupleable to said outer sleeve and to be movably coupleable to said inner sleeve, such that said actuator can provide a relative pulling motion to said inner sleeve with respect to said outer sleeve.

5. The tool of claim 4, wherein:

the tooth in each of the fingers is positioned horizontally to run in a direction perpendicular to a length of the inner sleeve.

6. The tool of claim 4, wherein the lower surface of the tooth in each of the fingers extends from the interior surface and faces toward the proximal end of the inner sleeve.

\* \* \* \* \*